(12) United States Patent
Fodor et al.

(10) Patent No.: US 7,873,459 B2
(45) Date of Patent: Jan. 18, 2011

(54) LOAD TRANSFER ADAPTIVE TRACTION CONTROL SYSTEM

(75) Inventors: Michael Fodor, Dearborn, MI (US); Davor Hrovat, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 359 days.

(21) Appl. No.: 11/161,325

(22) Filed: Jul. 29, 2005

(65) Prior Publication Data

US 2007/0027605 A1 Feb. 1, 2007

(51) Int. Cl.
B60T 8/32 (2006.01)

(52) U.S. Cl. ............. 701/74; 701/36; 701/45; 701/53; 701/54; 701/58; 701/59; 701/71; 701/75; 701/79; 701/82; 701/83; 701/84; 701/85; 701/86; 701/90; 701/124

(58) Field of Classification Search ............ 701/36, 701/45, 53, 54, 58, 59, 71, 75, 79, 82–86, 701/90, 124

See application file for complete search history.

(56) References Cited

U.S. PATENT DOCUMENTS

| | | | | | |
|---|---|---|---|---|---|
| 4,763,262 A | * | 8/1988 | Leiber | ................. | 701/90 |
| 4,898,431 A | * | 2/1990 | Karnopp et al. | ............. | 303/146 |
| 4,976,330 A | * | 12/1990 | Matsumoto | ................. | 180/197 |
| 5,172,319 A | * | 12/1992 | Shiraishi et al. | ............... | 701/90 |
| 5,198,982 A | * | 3/1993 | Kobayashi | ................... | 701/86 |
| 5,503,250 A | * | 4/1996 | Schantz et al. | .......... | 188/1.11 E |
| 5,742,918 A | * | 4/1998 | Ashrafi et al. | ................. | 701/70 |
| 5,839,799 A | * | 11/1998 | Fukada | ....................... | 303/146 |
| 5,954,026 A | * | 9/1999 | Stoss et al. | ............. | 123/406.24 |
| 6,062,336 A | * | 5/2000 | Amberkar et al. | ........... | 180/443 |
| 6,064,931 A | * | 5/2000 | Sawada et al. | ................ | 701/41 |
| 6,151,546 A | * | 11/2000 | Schmitt et al. | ................ | 701/84 |
| 6,169,939 B1 | * | 1/2001 | Raad et al. | ..................... | 701/1 |
| 6,263,261 B1 | * | 7/2001 | Brown et al. | .................... | 701/1 |
| 6,278,929 B1 | * | 8/2001 | Tozu et al. | ..................... | 701/70 |
| 6,292,759 B1 | * | 9/2001 | Schiffmann | .................. | 702/151 |
| 6,316,893 B1 | * | 11/2001 | Rasimus | ..................... | 318/432 |
| 6,334,656 B1 | * | 1/2002 | Furukawa et al. | ........... | 303/146 |
| 6,374,171 B2 | | 4/2002 | Weiberle et al. | | |
| 6,422,333 B1 | | 7/2002 | Kjaer et al. | | |
| 6,453,226 B1 | * | 9/2002 | Hac et al. | ..................... | 701/48 |
| 6,456,920 B1 | * | 9/2002 | Nishio et al. | .................. | 701/70 |
| 6,549,842 B1 | * | 4/2003 | Hac et al. | ..................... | 701/80 |

(Continued)

OTHER PUBLICATIONS

United Kingdom Examination Report from United Kingdom Application No. GB0612705.4, dated Aug. 11, 2009.

(Continued)

Primary Examiner—Khoi Tran
Assistant Examiner—Bhavesh V Amin
(74) Attorney, Agent, or Firm—O'Brien Jones, PLLC

(57) ABSTRACT

A method of controlling a vehicle that includes determining a dynamic normal load for the vehicle wheel, modifying the requested torque signal from a traction control system in response to the dynamic normal load to form a modified requested torque and controlling the engine in response to the modified requested torque. The controlling may be performed using the ratio of the dynamic normal load and the steady state normal load to form the modified requested torque.

19 Claims, 2 Drawing Sheets

U.S. PATENT DOCUMENTS

| | | | |
|---|---|---|---|
| 6,584,396 B2 | 6/2003 | Wetzel et al. | |
| 6,593,849 B2 | 7/2003 | Chubb et al. | |
| 6,658,342 B1 * | 12/2003 | Hac | 701/70 |
| 6,728,620 B2 | 4/2004 | Anwar | |
| 6,735,510 B2 | 5/2004 | Hac | |
| 6,904,349 B2 * | 6/2005 | Mori | 701/70 |
| 6,904,350 B2 * | 6/2005 | Lu et al. | 701/70 |
| 2001/0003805 A1 * | 6/2001 | Koibuchi | 701/9 |
| 2001/0041957 A1 * | 11/2001 | McCann et al. | 701/41 |
| 2005/0038589 A1 | 2/2005 | Shukla | |

OTHER PUBLICATIONS

United Kingdom Examination Report from United Kingdom Application No. GB0612705.4, dated Dec. 21, 2009.

* cited by examiner

LOAD TRANSFER ADAPTIVE TRACTION CONTROL SYSTEM

TECHNICAL FIELD

The present invention relates generally to a traction control system, and more particularly, to a drive control system that adapts to changes in load transfers during operation.

BACKGROUND

Traction control systems attempt to optimize vehicle acceleration and handling performance under low road/tire interface friction levels by controlling the slip of the driven wheels through wheel torque management via powertrain torque and possibly brake torque control. The friction forces acting at the driven wheel road/tire interfaces depend largely on the normal forces acting on these wheels. Estimating the normal forces and accounting for them in the control system can improve overall system performance.

During a traction control event as the load transfers from side to side, or front to rear during dynamic maneuvers, increasing normal loads requires increasing drive axle torque. Prior systems cause undershoots or insufficient driven wheel slip to fully utilize the available surface friction. Decreasing normal loads, on the other hand, leads to wheel speed flares because the inside wheels cannot support the torque.

It would therefore be desirable to adjust the traction control system to take into consideration load transfer to prevent undershoots or flares.

SUMMARY

The present invention improves a traction control system by allowing the traction control system to adjust to a change in the load transfer of a vehicle. The present invention also allows a determination of the coefficient of friction or mu of the road surface.

In one aspect of the invention, a method of controlling a vehicle includes determining a dynamic normal load for the vehicle wheel, modifying the requested torque signal from a traction control system in response to the dynamic normal load to form a modified requested torque, and controlling the engine in response to the modified requested torque. The controlling may be performed using the ratio of the dynamic normal load and the steady state normal load to form the modified requested torque.

One advantage of the invention is that a load shift for the vehicle may be easily determined and compensated for by the system. An additional advantage is that a surface friction level may also be determined using the dynamic normal force.

Other advantages and features of the present invention will become apparent when viewed in light of the detailed description of the preferred embodiment when taken in conjunction with the attached drawings and appended claims.

DETAILED DESCRIPTION OF THE PREFERRED EMBODIMENT

Figure 1:
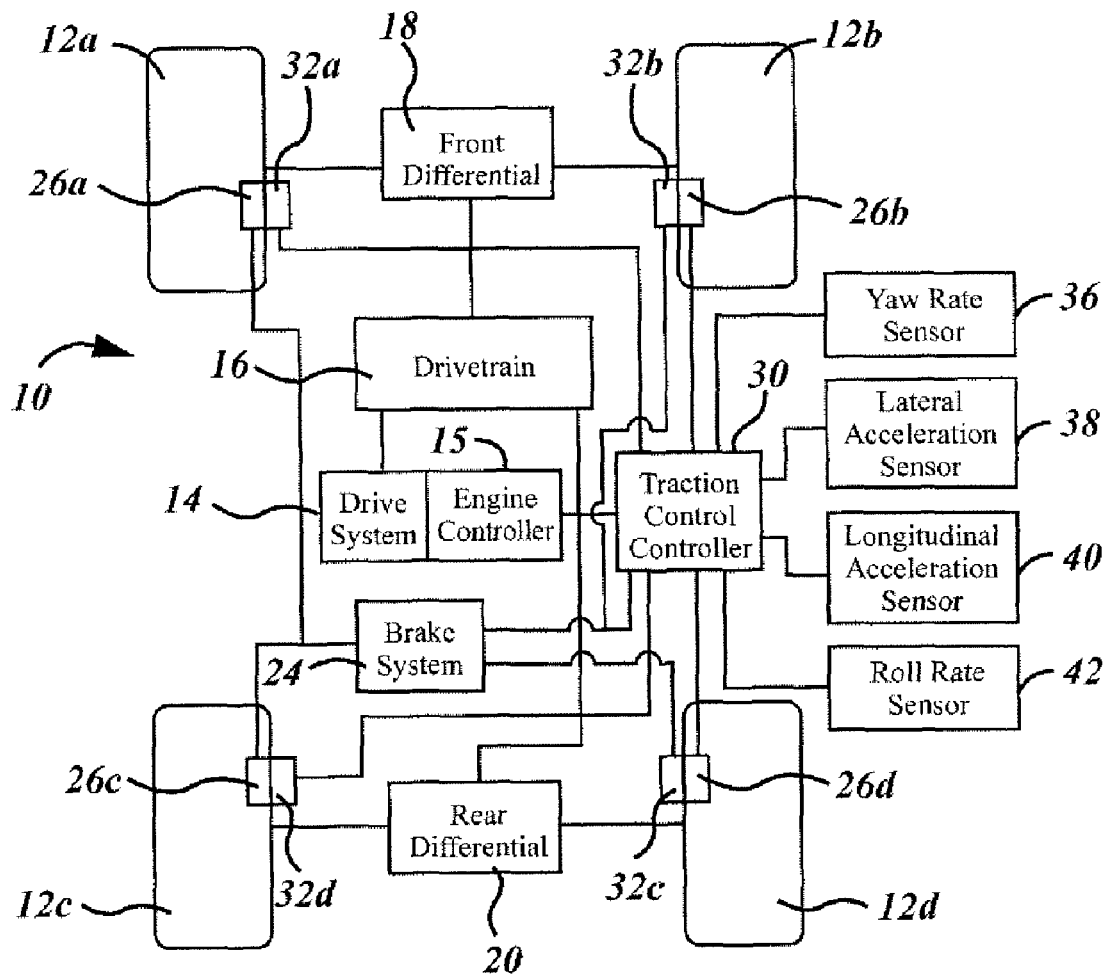
FIG. 1 is a block diagrammatic view of a vehicle having a traction control system according to the present invention.

The drawing figures discussed as follows show a traction control system (TCS) that may be used for an engine-only traction control system. However, the teachings of the present invention may also be applicable to engine and brake-type traction control systems. Also, the following description is set forth with respect to side-to-side (lateral) loading shift. The teaching may also be applied to longitudinal loading shift.

An automotive vehicle 10 is illustrated having wheel and tire assemblies 12a, 12b, 12c, and 12d. A drive system 14 coupled to a drivetrain 16 provides power to the wheel and tire assemblies 12 through the front differential 18 and rear differential 20. The drive system 14 may include an engine controller 15 that is microprocessor-based. The engine controller 15 may be used to control the amount of torque and thus the amount of slip generated at each of the wheels. The drive system 14 may vary the amount of engine power to effect the change in torque at the wheel and tire assemblies 12. A reduction in the amount of fuel and changing other parameters may reduce the amount of power output from the engine. It should also be noted that the drive system may include an internal combustion-only type system, a hybrid system, an electric drive system, or a fuel cell system.

The drive system 14 provides torque through the drivetrain 16 which may include a transmission, front differential 18 and rear differential 20. In a rear-wheel drive vehicle, only the rear differential 20 would be present. A four or all-wheel drive system may include both the front differential 18 and the rear differential 20. Also, in certain all-wheel drive systems, an additional center differential may be provided.

A brake system 24 that may include electric, electro-hydraulic, or hydraulic systems is used to actuate the brakes 26a, 26b, 26c, and 26d. The brakes are activated in response to driver input. The brake system 24 may also be activated in response to a traction control system that includes a traction control controller 30.

The traction control system and thus the controller 30 may be coupled directly or indirectly to wheel speed sensors 32a, 32b, 32c, and 32d. As illustrated, the wheel speed sensors are coupled directly to the wheels. The wheel speed sensors may be the output from an anti-lock brake system, an axle sensor or the like.

It should be noted that the wheels driven by the drive system 14 are referred to as driven wheels whereas wheels that are not coupled to the engine are referred to as undriven wheels. In the following description, the speed of the undriven wheels may be used as the reference speed. In four-wheel or all-wheel drive systems no wheels are undriven and thus various algorithms may be used to determine the reference speed. The reference speed may correspond to a vehicle speed. Wheels that are touching the road surface and have a torque level below a certain torque threshold may be included in such algorithms.

The traction controller 30 is coupled to the drive system 14. The traction controller 30 may generate a control signal or torque command to reduce the amount of torque to the engine upon the sensing of a slipping wheel.

Various dynamic sensors may be coupled to the traction controller 30. Dynamic sensors may include a yaw rate sensor 36, a lateral acceleration sensor 38, and a longitudinal acceleration sensor 40. The yaw rate sensor 36 generates a yaw rate signal corresponding to the yaw rate of the vehicle. From the yaw rate sensor 36, the yaw acceleration may also be determined. The lateral acceleration sensor 38 generates a lateral acceleration signal corresponding to the lateral acceleration of the vehicle body. The longitudinal acceleration sensor 40 generates a longitudinal acceleration signal corresponding to the longitudinal acceleration of the vehicle 10. The various sensors may be directly coupled to the traction controller 30 or may be coupled to various vehicle dynamic control systems such as a yaw control system or a rollover stability control (RSC) system. A roll rate sensor 42 may also be used to determine load transfer for the vehicle 10.

Figure 2A:
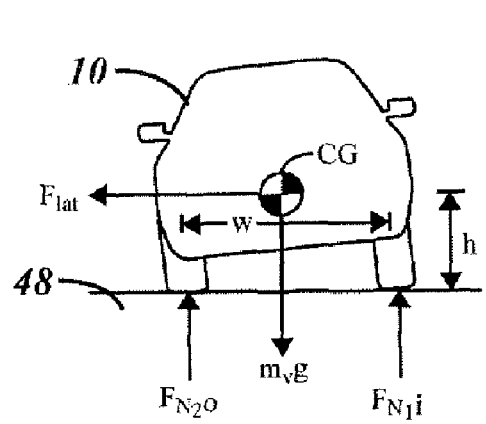
FIGS. 2A and 2B are diagrammatic views of a vehicle with associated variables thereon.
Figure 2B:
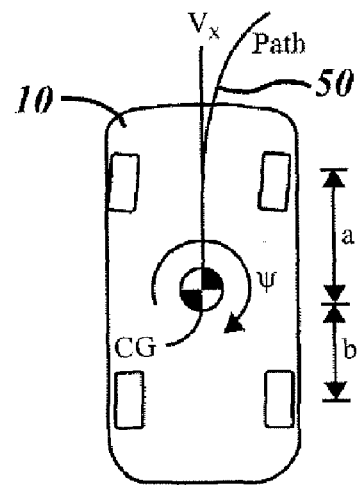

Referring now to FIGS. 2A and 2B, automotive vehicle 10 with various variables associated therewith is illustrated. The vehicle 10 is disposed on road surface 48 and has a center of gravity CG. A lateral force $F_{lat}$ is shown acting laterally on the center of gravity of the vehicle. The track width of the vehicle is set forth by w. The height of the center of gravity of the vehicle is h. The weight of the vehicle is the $m_v g$. The normal forces acting on the tires are $F_n$. In FIG. 2A, only two normal forces are illustrated. Each of the wheels/tire assemblies have a separate normal force. As is best shown in FIG. 2B, the vehicle is turning right as indicated by the path 50. The vehicle velocity is in the direction $V_x$. The distance between the front wheel axle and the center of gravity is given by a. The distance between the center of gravity and the rear axle is given by b. The yaw rate $\psi$ or yaw acceleration $\dot\psi$ is shown around the center of gravity of the vehicle. As is best seen in FIG. 2A, when the vehicle turns right, load transfers to the outside wheels.

Described below are methods for estimating tire normal forces relevant to traction control system performance and accounting for normal force changes in the control system.

Normal Force Estimation

Figure 3:
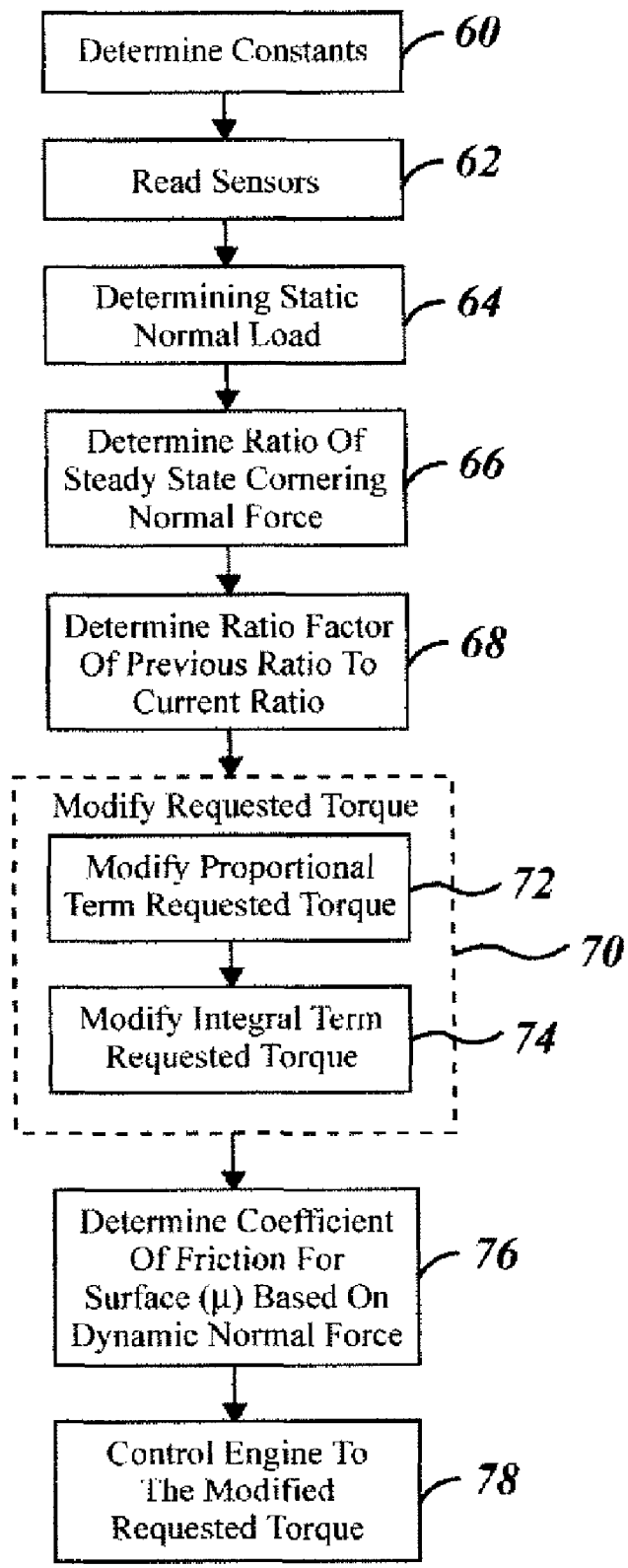
FIG. 3 is a flow chart illustrating a method for operating the invention.

Referring now to FIG. 3, a method of determining normal forces acting on the wheels is described. In step 60, various constants are determined. Various constants for the vehicle may be determined experimentally or calculated based upon various criteria. These values do not change during the operation of the vehicle. Examples of such constants include the constant for gravity, the distance from the front and rear wheels to the center of gravity to the vehicle, the mass of the vehicle, the height of the center of gravity, and the wheel track width. These were described above with respect to FIG. 2.

In step 62, the various sensors are read. The various sensors may include the yaw rate sensor, lateral acceleration sensor, and longitudinal acceleration sensor described above.

Load transfer to the four wheels of the vehicle may be determined for steady state maneuvering by knowing vehicle mass, longitudinal and lateral accelerations, and the location of the vehicle's center of gravity (roadway grade is ignored here). Dynamic load transfer (non-steady state) also requires knowledge of the vehicle's suspension system construction and tuning and is not considered here. For the vehicle standing still or operating with no longitudinal or lateral acceleration, the normal load on either driven wheel is determined in step 64 and is given by $$F_{N,parked} = \frac{m_v g b}{2(a+b)} \quad (1)$$

for front wheel drive, or $$F_{N,parked} = \frac{m_v g a}{2(a+b)} \quad (2)$$

for rear wheel drive, assuming that the vehicle's center of gravity falls directly on the midline of the vehicle. Given this definition, the ratio of steady state cornering normal force to nominal (static) normal force for the inside driven wheel (the wheel of primary interest for traction control) is determined in step 66 and is given by $$\frac{F_{N,inside}}{F_{N,parked}} = 1 - \frac{2F_{lat}h}{m_v g w} \quad (3)$$

if longitudinal acceleration is zero. Under normal operation, cornering is achieved with the vehicle's longitudinal axis nearly tangential to the vehicle's path. While this condition holds, the lateral force on the vehicle may be approximated using the relation $$F_{lat} \approx m_v V_x \dot\psi \quad (4)$$

Substituting Equation (4) into (3) yields $$\frac{F_{N,inside}}{F_{N,parked}} = 1 - \frac{2 V_x \dot\psi h}{g w} \quad (5)$$

For straight line acceleration or deceleration (no cornering), the same force ratio is given by $$\frac{F_{N,driven}}{F_{N,parked}} = 1 - \frac{\dot V_x h}{g b} \quad (6)$$

for front wheel drive, and $$\frac{F_{N,driven}}{F_{N,parked}} = 1 + \frac{\dot V_x h}{g a} \quad (7)$$

for rear wheel drive. For combined cornering and acceleration (although the steady state assumption may be abused here since these are not really steady state conditions) the Equation 4 and Equations 5/6 relationships can be combined by multiplication yielding $$\frac{F_{N,inside}}{F_{N,parked}} = \left(1 - \frac{\dot V_x h}{g b}\right)\left(1 - \frac{2 V_x \dot\psi h}{g w}\right) \quad (8)$$

for front wheel drive and $$\frac{F_{N,inside}}{F_{N,parked}} = \left(1 + \frac{\dot V_x h}{g a}\right)\left(1 - \frac{2 V_x \dot\psi h}{g w}\right) \quad (9)$$

for rear wheel drive.

For low body sideslip angle operation, vehicle yaw rate can be estimated using the difference between the nondriven wheel speeds:

$$\dot\psi \approx \frac{\Delta \omega_{nd} r_t}{w} \quad (10)$$

where $r_t$ is tire radius.

Thus, several different methods for determining the ratio of step 66 of dynamic or driven normal load to static normal load is set forth.

Accounting for Load Transfer During Traction Control

During maneuvering, the load on the inside driven wheel generally determines the maximum torque that may be applied to the axle for traction control. This is true for axles with open differentials or torque biased limited slip differentials. Locking axles do not see this limitation. For the former case, abrupt changes in inside wheel loading may cause wheel speed tracking errors for the traction control system. Increasing normal loads require an increase in driven axle torque, and if not accounted for, may cause undershoots or "touchdowns". Similarly, decreasing normal loads lead to overshoots or "flares" as the inside wheel may no longer support former torque levels. Altering the powertrain (or braking system) output torque based on a torque ratio that moves with the changing normal force can help to eliminate some of the tracking errors due to normal force change.

This is accomplished in a discrete-event control system by calculating the normal force at each time step (Equation 8 or 9), constructing a ratio of the current normal force to that at the previous time step, and applying this ratio (by multiplication) to the output of the traction control wheel speed tracking compensator. Thus, if the normal force (ratio) at the current time step is given by $$R_{NF} = \frac{F_{N,inside}}{F_{N,parked}} \quad (11)$$

the ratio of this value to its previous value is given by $$R_{FR} = \frac{R_{NF}(t)}{R_{NF}(t - \Delta t)} \quad (12)$$

Finally, the requested torque of the control system may be modified in step 70 to reflect the normal force change. This may be accomplished in an incremental-type control system by multiplying the previous time step control values by the Equation (12) ratio factor before adding the current time step incremental control updates. Thus, for a proportional/integral controller, the new proportional term requested torque contribution to desired torque is given in step 72 by $$\tau_p(t) = R_{FR}\tau_p(t-\Delta t) + \Delta\tau_p \quad (13)$$

and the new integral term requested torque contribution is given in step 74 by $$\tau_i(t) = R_{FR}\tau_i(t-\Delta t) + \Delta\tau_i \quad (14)$$

This modification may be improved for vehicles with a limited slip differential by explicitly accounting for the torque bias across the axle.

The coefficient of friction or mu may be determined by the normal force divided by the force to spin the tire. The force to spin the tire is given by the requested torque times the rolling radius of the tire.

$$\frac{F_{normaldyn}}{\text{Torque to spin } x \text{ outer radius of tire}} = \mu \quad 15)$$

Mu-estimation µ can also benefit from the estimated normal force change. Here the dynamic rather than static (or nominal) normal force to estimate the mu coefficient for the spinning wheel(s) is used, allowing for more appropriate slip targets during cornering.

The engine is then controlled to the modified requested torque. This may be performed directly in a controller or calculated in a traction control controller and communicated to an engine controller.

Due to propensity of the wheel to spin even on dry roads during hard cornering as a result of load transfer, the trigger threshold may be increased for traction control intervention as a function of decreasing normal load of the inside wheel. One example may add a value to the existing threshold as a two-dimensional function of the inside wheel normal force ratio as given by Equation (8) or (9) from above.

While particular embodiments of the invention have been shown and described, numerous variations and alternate embodiments will occur to those skilled in the art. Accordingly, it is intended that the invention be limited only in terms of the appended claims.

What is claimed is:

1. A method for controlling a vehicle with a traction control system that accounts for load transfers during vehicle operation, the method comprising:
controlling a drive wheel of the vehicle according to a modified power train torque request, the power train torque request being modified in response to torque transfer on an inside driven wheel of the vehicle and based on a lateral acceleration of the vehicle, a longitudinal acceleration of the vehicle, a yaw rate of the vehicle, and a difference between undriven wheel speeds of the vehicle.

2. The method of claim 1, further comprising sensing and estimating the yaw rate of the vehicle.

3. The method of claim 1, further comprising estimating a road surface coefficient of friction based on the dynamic normal load and the modified power train torque request.

4. The method of claim 1, further comprising inputting the modified power train torque request to a wheel torque management system of the vehicle via powertrain torque control.

5. The method of claim 1, further comprising inputting the modified power train torque request to a wheel torque management system of the vehicle via brake torque control.

6. The method of claim 1, wherein the load transfer is side-to-side.

7. The method of claim 1, wherein the load transfer is front-to-rear.

8. The method of claim 1, further comprising estimating dynamic normal load of the drive wheel of a front-wheel-drive vehicle with the following equation $$F_{N,parked} = \frac{m_v g b}{2(a+b)}$$

wherein $m_v g$ represents a weight of the vehicle, a represents a distance between a center-of-gravity of the vehicle and a front axis of the vehicle, and b represents a distance between a center-of-gravity of the vehicle and a rear axis of the vehicle.

9. The method of claim 1, further comprising estimating dynamic normal load of the drive wheel of a rear-wheel-drive vehicle with the following equation $$F_{N,parked} = \frac{m_v g a}{2(a+b)}$$

wherein $m_v g$ represents a weight of the vehicle, a represents a distance between a center-of-gravity of the vehicle and a front axis of the vehicle, and b represents a distance between a center-of-gravity of the vehicle and a rear axis of the vehicle.

10. A method for controlling a vehicle with a traction control system that accounts for load transfers during vehicle operation on a road surface, the method comprising:
inputting constants representing gravity, a distance from a front axle to a center-of-gravity of the vehicle, a distance from a rear axle to a center-of-gravity of the vehicle, a mass of the vehicle, a height of the center-of-gravity of the vehicle, and a track width of the vehicle;
inputting signals from sensors including a yaw rate sensor, a lateral acceleration sensor, and a longitudinal acceleration sensor;

calculating a static normal load force of the inside driven wheel;

calculating a ratio of a steady state cornering normal force of the inside driven wheel to the static normal load force of the inside driven wheel;

calculating a ratio factor representing a ratio of a previous ratio of the steady state cornering normal force of the inside driven wheel to the static normal load force of the inside driven wheel to a current ratio of the steady state cornering normal force of the inside driven wheel to the static normal load force of the inside driven wheel;

modifying a requested torque to reflect the change in the ratio of the steady state cornering normal force of the inside driven wheel to the static normal load force of the inside driven wheel; and controlling one or more of an engine of the vehicle and brakes of the vehicle according to the modified requested torque.

11. The method of claim 10, wherein the static normal load for the inside driven wheel in a front-wheel-drive vehicle is calculated with the following equation $$F_{N,parked} = \frac{m_v g b}{2(a+b)}$$

wherein $m_v g$ represents a weight of the vehicle, a represents a distance between a center-of-gravity of the vehicle and a front axis of the vehicle, and b represents a distance between a center-of-gravity of the vehicle and a rear axis of the vehicle.

12. The method of claim 10, wherein the static normal load for the inside driven wheel in a rear-wheel-drive vehicle is calculated with the following equation $$F_{N,parked} = \frac{m_v g a}{2(a+b)}$$

wherein $m_v g$ represents a weight of the vehicle, a represents a distance between a center-of-gravity of the vehicle and a front axis of the vehicle, and b represents a distance between a center-of-gravity of the vehicle and a rear axis of the vehicle.

13. The method of claim 11, wherein the ratio of the steady state cornering normal force of the inside driven wheel to the static normal load force of the inside driven wheel is calculated with the following equation $$\frac{F_{N,inside}}{F_{N,parked}} = 1 - \frac{2F_{lat}h}{m_v g w}$$

wherein $F_{lat}$ represents lateral force on the vehicle, h represents the height of the center-of-gravity of the vehicle, and w represents the track width of the vehicle.

14. The method of claim 12, wherein the ratio of the steady state cornering normal force of the inside driven wheel to the static normal load force of the inside driven wheel is calculated with the following equation $$\frac{F_{N,inside}}{F_{N,parked}} = 1 - \frac{2F_{lat}h}{m_v g w}$$

wherein $F_{lat}$ represents lateral force on the vehicle, h represents the height of the center-of-gravity of the vehicle, and w represents the track width of the vehicle.

15. The method of claim 13, wherein the lateral force on the vehicle is calculated with the following equation $$F_{lat} \approx m_v V_x \dot{\psi}$$

wherein V represents a longitudinal velocity of the vehicle, $m_v$ represents a mass of the vehicle, and $\dot{\psi}$ represents a yaw acceleration of the vehicle.

16. The method of claim 14, wherein the lateral force on the vehicle is calculated with the following equation $$F_{lat} \approx m_v V_x \dot{\psi}$$

wherein V represents a longitudinal velocity of the vehicle, $m_v$ represents a mass of the vehicle, and $\dot{\psi}$ represents a yaw acceleration of the vehicle.

17. The method of claim 16, wherein the yaw acceleration is estimated with the following equation $$\dot{\psi} \approx \frac{\Delta \omega_{nd} r_t}{w}$$

wherein $r_t$ represents a radius of a tire of the vehicle.

18. The method of claim 10, further comprising sensing and estimating the yaw rate of the vehicle.

19. The method of claim 10, further comprising estimating a road surface coefficient of friction based on the steady state cornering normal force of the inside driven wheel and the modified torque request.

* * * * *

UNITED STATES PATENT AND TRADEMARK OFFICE
CERTIFICATE OF CORRECTION

PATENT NO. : 7,873,459 B2
APPLICATION NO. : 11/161325
DATED : January 18, 2011
INVENTOR(S) : Michael Fodor and Davor Hrovat It is certified that error appears in the above-identified patent and that said Letters Patent is hereby corrected as shown below:

Change "normal force" to --force to spin the tire-- at column 5, line 42.

Change "force to spin the tire" to --normal force-- at column 5, line 42.

Change "requested torque times" to --driving torque divided by-- at column 5, lines 43-44.

Change equation 15, starting at column 5, line 45, from $$``\frac{F_{normaldyn}}{\text{Torque to spin} * \text{outer radius of tire}} = \mu\text{''}$$

to $$--\frac{\text{Torque to spin}}{F_{normaldyn} * \text{outer radius of tire}} = \mu--.$$

Signed and Sealed this
Fifteenth Day of November, 2011

David J. Kappos
*Director of the United States Patent and Trademark Office*